(12) United States Patent
Dierberger

(10) Patent No.: US 7,955,446 B2
(45) Date of Patent: Jun. 7, 2011

(54) WELDING REPAIR METHOD FOR FULL HOOP STRUCTURES

(75) Inventor: James A. Dierberger, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/731,183

(22) Filed: Mar. 25, 2010

(65) Prior Publication Data

US 2010/0178165 A1    Jul. 15, 2010

Related U.S. Application Data

(62) Division of application No. 11/208,801, filed on Aug. 22, 2005, now Pat. No. 7,744,709.

(51) Int. Cl.
*C22C 19/00* (2006.01)

(52) U.S. Cl. .................................. 148/400; 415/215.1

(58) Field of Classification Search .......... 148/519–521, 148/570–571, 589–594, 627, 639–643, 674–677, 148/714, 400, 442; 219/617, 642–644; 228/119, 228/227, 230, 231; 415/215.1; 428/544
See application file for complete search history.

(56) References Cited

U.S. PATENT DOCUMENTS

| 3,807,715 | A | 4/1974 | Nelson et al. |
| 4,611,744 | A * | 9/1986 | Fraser et al. .................. 228/119 |
| 4,975,128 | A | 12/1990 | Schmitz |
| 5,189,279 | A | 2/1993 | Foster et al. |
| 6,115,917 | A | 9/2000 | Nolan et al. |
| 6,494,683 | B1 | 12/2002 | Nolan et al. |

FOREIGN PATENT DOCUMENTS

EP    1207005    5/2002
EP    1323842    7/2003

OTHER PUBLICATIONS

European Search Report Dated Dec. 29, 2006 for application EP 06254283.

* cited by examiner

*Primary Examiner* — George Wyszomierski
*Assistant Examiner* — Mark L Shevin
(74) *Attorney, Agent, or Firm* — Carlson, Gaskey & Olds, PC

(57) ABSTRACT

A unique heat treat method for relieving stresses caused by a repairing weld joint in a full hoop part heat treats locally, at the location of the weld joint, and at a diametrically opposed location. By providing the diametrically opposed heat treat location, the present invention relieves stresses caused by the weld joint, without creating any additional residual stress in the weld joint.

8 Claims, 2 Drawing Sheets

WELDING REPAIR METHOD FOR FULL HOOP STRUCTURES

RELATED APPLICATION

This application is a divisional of U.S. patent application Ser. No. 11/208,801, which was filed Aug. 22, 2005, now U.S. Pat. No. 7,744,709, issued Jun. 29, 2010.

BACKGROUND

This application relates to a method of repairing a full hoop structure with a welding process, wherein heat treating is performed both at the location of the weld, and at a diametrically opposed location.

Welding methods are sometimes necessary to repair metallic structures. As an example, a cast part may have a defect such as shrinkage that may have occurred in a cast mold. Alternatively, small cracks may form in the part.

Such operations are often used in components for gas turbine engines. Structures that could be called "full hoop," or structures that surround a central axis for 360°, often require such welding procedures. Examples of such parts in a gas turbine engine would be a diffuser case and a turbine exhaust case.

The weld being performed at a location on the part may cause an unacceptably high residual stress. In the prior art, this stress has been relieved by some post-weld heat treatment.

In one prior art method, the entire structure has been heated isothermally to heat-treat temperatures. Heating isothermally does not induce additional thermal stress at the weld, so the residual stress remains constant until actual heat treatment takes place. This "global" heating can affect dimensions that have been "machined" into the part by causing their residual stresses to also relax. In many cases, it has not been found practical due to cost and complexity to fixture the part during heat treatment to hold these dimensions constant.

Thus, localized heat treatment has also been utilized to avoid loss of dimensions. Local heat treatment can have unforeseen and potentially detrimental effects on the intended stress relaxation. The region being heated locally will expand due to its temperature change. The surrounding non-heated material will resist this expansion causing the heated area to become more compressively loaded. Since the residual stress due to weld is tensile, the net effect of local heating is to temporarily reduce the value of the tensile stress in the weld. If sufficient care is not exercised, it is possible to reduce the value of the tensile stress so much so as to eliminate it completely. In this case, subsequent heat treatment for stress relaxation would be ineffective since the stress would already be reduced to zero. Note that the full value of the residual stress in this case would return when the locally applied temperature was removed.

Also of concern, would be a situation in which the weld stress was reduced by local heating through zero and into a state of compression. This stress would relax during subsequent heat treatment, but this is far from the original intent of the heat treatment process, which was to reduce the tensile residual stress associated with the weld.

SUMMARY

In the disclosed embodiment of this invention, a weld repair is made on a part with a full hoop structure. After the weld has been completed, heat-treating is performed at the location of the weld, and at the same time, at a second opposed location. In a disclosed embodiment, the second location is diametrically opposed to the weld location. This heat-treating is preferably confined to as narrow a band as possible through the weld and its heat affected zone, and in a similar manner, at an opposed position to it. Furthermore, the heat-treating preferably occurs along an entire axial length of the part.

The opposed bands of heat-treating eliminate the compressive stresses mentioned above from forming. This allows the modified local heat treatment to mimic the beneficial effect of a global heat treatment as mentioned above while avoiding the inherent problems.

While in the disclosed embodiment the part is a full hoop part, the present invention is more powerful, and extends beyond any particular shape of part. In fact, an arbitrarily shaped part could benefit from this present invention. In an arbitrarily shaped part, an area of material on the part would be identified about which the part would thermally expand while not creating additional stress in the part at a weld treatment location. The weld treatment would be provided, and simultaneously, a local heat treatment would be provided at an area of the weld treatment, and at the identified area.

In other optional embodiments, the second band could be a plurality of bands, which are displaced from the diametrically opposed location. As an example, two separate bands spaced equally about a location spaced 180° from the weld treatment area could be utilized rather than a single second band.

In yet another embodiment, the second band can extend for a greater circumferential extent than the band about the weld treatment. In this manner, the heat treating on the second band can be at a lower temperature. By utilizing a lower temperature, the potential resultant dimensional changes in that second region can be reduced. Such dimensional changes are related to temperature, and thus being able to utilize a lower temperature, albeit over a larger area, might prove beneficial under certain applications.

These and other features of the present invention can be best understood from the following specification and drawings, the following of which is a brief description.

DETAILED DESCRIPTION

Figure 1:
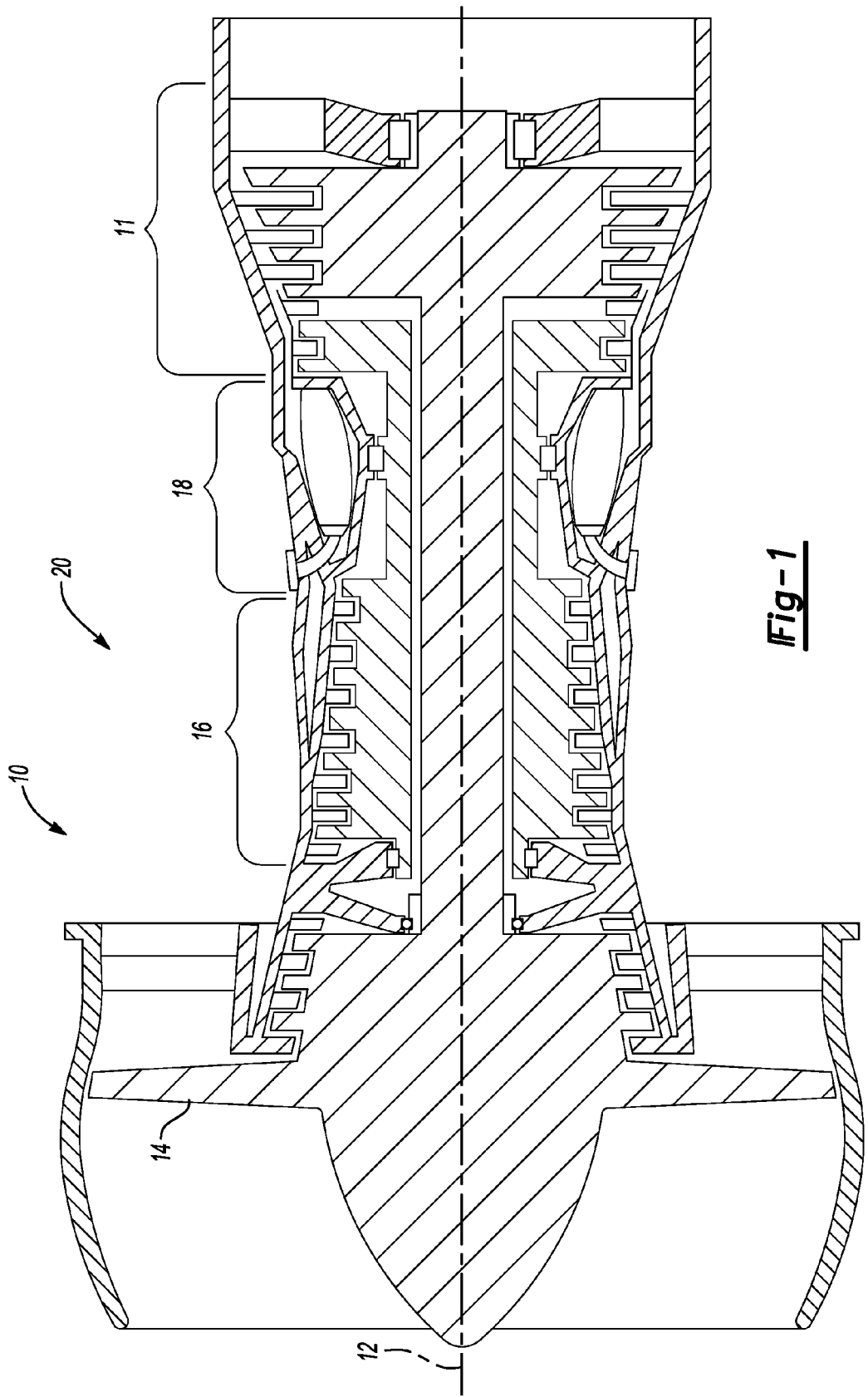
FIG. 1 schematically shows a gas turbine engine.

A gas turbine engine 10 is illustrated in FIG. 1 extending along an axial center line 12. A fan section 14 is upstream of a compressor section 16, a combustion section 18, and a turbine section 11. As is known, many components of a gas turbine engine 10 could be said to have a "full hoop" structure. The full hoop is defined as a structure that surrounds the axial center line 12 for 360°. An example of such full hoop structures found in the gas turbine engine 10 would include a diffuser case located downstream of the compressor, or a turbine exhaust case located downstream of the turbine section 11. The term "full hoop" should not be taken as requiring that the component would be cylindrical. In fact, the disclosed components could be better described as somewhat conical. Even that shape is not a limitation on the definition of "full hoop" which could extend to non-symmetrical structures, or structures with complex surfaces and multi-faceted shapes at their outer surfaces.

Figure 2:
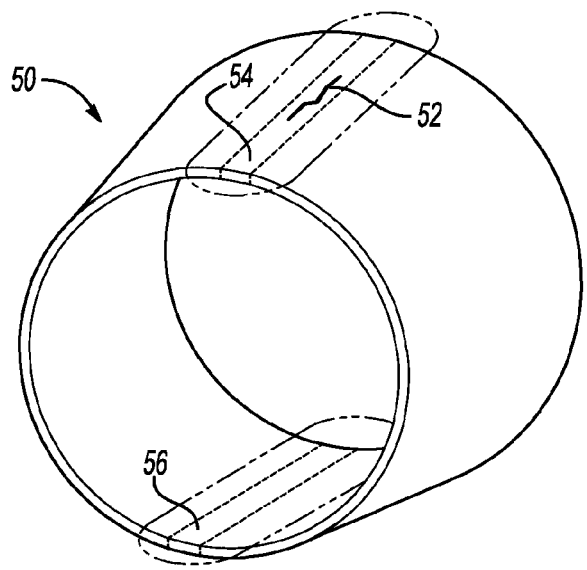
FIG. 2 is a schematic view of a full hoop part.

As shown in FIG. 2, such a part 50 can have defects such as a crack shown at 52. Other type defects may be a casting defect such as may be caused by shrinkage. A worker of ordinary skill in the art would recognize many of the known defects, which could require welding repair treatment.

Figure 3:
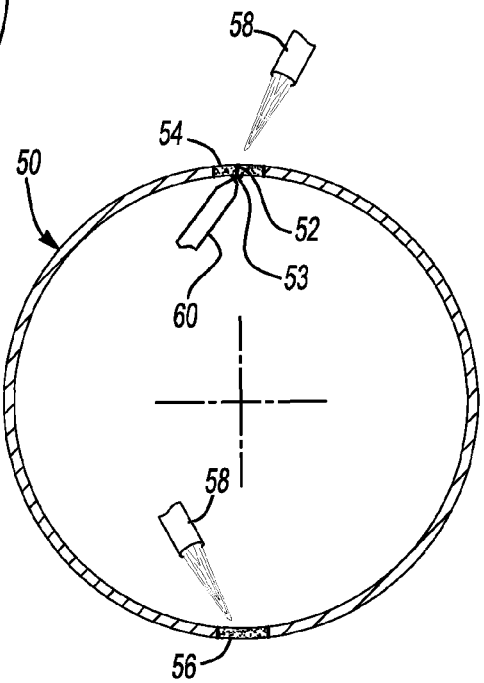
FIG. 3 is a cross-sectional view of a heat treatment occurring on the mentioned part.

As shown in FIG. 3, a weld treatment 53 is being applied schematically by welding tool 60 at the crack 52. With the present invention, and after completion of the welding treatment, two narrow bands of heat treatment are applied at diametrically opposed locations 54 and 56. Preferably the circumferential extent of the bands is selected to only be wide enough to provide the stress relief at the weld joint 53 along the defect 52. Thus, the bands may well have the same circumferential width. As shown, heating structures 58 create these two heat treat locations. The heating structures may be induction coils, radiant lamps, gas burners, etc. The heat treatment can be on the order of 1500° F., although the heat treat temperatures may be as known in the art. The bands 54 and 56 extend along the entire length of the part 50, as shown in FIG. 2. Of course, it may also be that the bands do not extend for the entire length of the part.

The present invention, by utilizing the two diametrically opposed bands, achieves the benefits provided by the global heating of the prior art, but also avoids the problems of global heating as encountered in the prior art.

Also, while the present invention is disclosed as being directed to full hoop parts, it would have benefits in certain parts that do not have the full hoop structure as defined above. Arbitrarily shaped parts could benefit from the present invention by heat treating two distinct zones, to allow the numerical value of weld residual stress to be heat treated, while greatly reducing or eliminating the liability of resultant dimensional changes. For non-full hoop structures, a line or plane of material to be locally heat treated as the second band, is the line or plane about which the structure would thermally expand without creating additional stress in the component at the weld. A worker of ordinary skill in this art can determine this line or plane with structural analysis.

Figure 4:
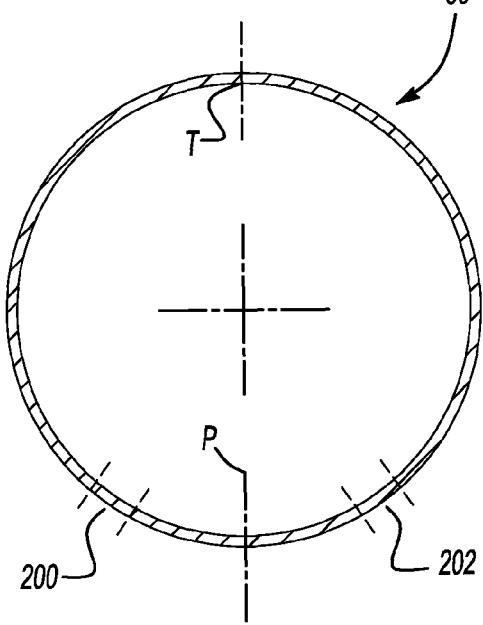
FIG. 4 shows yet another embodiment.

FIG. 4 shows another embodiment wherein the "second band" is actually provided by two separate bands 202 and 204. As can be appreciated, the two separate bands are disclosed as being spaced equally about the point P spaced 180° from the weld treatment area T. By positioning these separate bands about the point P, the beneficial effects provided by the above-disclosed embodiment can be achieved.

Figure 5:
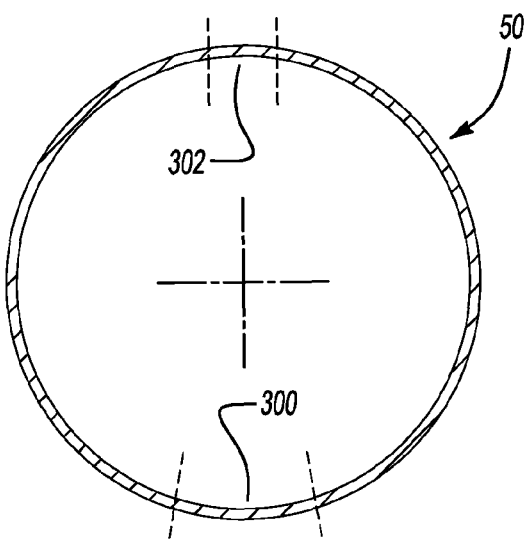
FIG. 5 shows yet another embodiment.

FIG. 5 shows yet another embodiment wherein the circumferential extent of the second band 300 is wider than the circumferential extent of the weld band 302. The temperature provided at the second band 300 can be lower, such that potential resultant dimensional changes in this second band are reduced.

Again, a worker of ordinary skill in the art would recognize how to incorporate the optional embodiments of FIGS. 4 and 5 to best effect.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A component comprising:
   a component body having an axial center line, and extending for 360° about said axial center line;
   a weld treatment at a circumferential location within said 360°, said component body being heat-treated after formation of said weld treatment at a first band incorporating said weld joint, and at a second band spaced from said first band about said axial center line;
   said second band being centered at a circumferential location spaced by 180° from a center of said first band.

2. The component as set forth in claim 1, wherein said first and second bands are selected to be of approximately equal circumferential extent.

3. The component as set forth in claim 1, wherein said component is a gas turbine engine part.

4. The component as set forth in claim 1, wherein said second band is a single band centered on the location spaced by 180° from the center of said first band.

5. The component as set forth in claim 1, wherein said second band is a pair of second band portions which are equally spaced about the location that is spaced 180° such that said second band is centered about the location spaced by 180°.

6. The component as set forth in claim 1, wherein said second band extends for a greater circumferential extent than said first band.

7. A component comprising:
   a component body having an axial center line, and extending for 360° about said axial center line;
   a weld treatment at a circumferential location within said 360°, said component body being heat-treated after formation of said weld treatment at a first band incorporating said weld joint, and at a second band spaced from said first band about said axial center line;
   said component being a gas turbine engine part; and
   said component being a diffuser case.

8. A component comprising:
   a component body having an axial center line, and extending for 360° about said axial center line;
   a weld treatment at a circumferential location within said 360°, said component body being heat-treated after formation of said weld treatment at a first band incorporating said weld joint, and at a second band spaced from said first band about said axial center line;
   said component being a gas turbine engine part; and
   said component being a turbine exhaust case.

* * * * *